(12) United States Patent
Sollich

(10) Patent No.: US 7,430,734 B2
(45) Date of Patent: *Sep. 30, 2008

(54) INTERFACE INVOKE MECHANISM

(75) Inventor: Peter F. Sollich, Munich (DE)

(73) Assignee: Microsoft Corporation, Redmond, WA (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/079,433

(22) Filed: Mar. 14, 2005

(65) Prior Publication Data

US 2005/0172301 A1    Aug. 4, 2005

Related U.S. Application Data

(63) Continuation of application No. 09/901,254, filed on Jul. 9, 2001, now Pat. No. 6,941,550.

(51) Int. Cl.
  G06F 9/44 (2006.01)
(52) U.S. Cl. .................................................. 717/166
(58) Field of Classification Search ................ 717/140, 717/162, 166; 707/102; 719/315, 330, 316; 726/13, 17; 715/769; 716/1, 16
  See application file for complete search history.

(56) References Cited

U.S. PATENT DOCUMENTS

| | | | |
|---|---|---|---|
| 5,842,018 A | 11/1998 | Atkinson et al. | |
| 6,163,880 A | 12/2000 | Ramalingam et al. | |
| 6,209,040 B1 | 3/2001 | Acton et al. | |
| 6,226,692 B1 * | 5/2001 | Miloushev et al. | 719/316 |
| 6,263,379 B1 | 7/2001 | Atkinson et al. | |
| 6,393,491 B1 | 5/2002 | Bracha et al. | |
| 6,651,248 B1 * | 11/2003 | Alpern | 717/162 |
| 6,941,550 B1 * | 9/2005 | Sollich | 717/166 |
| 2004/0015912 A1 | 1/2004 | Bottomley | |

OTHER PUBLICATIONS

Driesen e a. Selector Table Indexing a Sparse Arrayst', Conference of Object-oriented, Oct. 1993.
Gagnon et al., "SableVM: A Research Framework for the Efficient Execution of Java Bytecode", Proceedings of the Java Virtual Machine Research ad Technology Symposium, 2-4, 2001.
Provisional application: 601252,170, 601276,375.

* cited by examiner

Primary Examiner—Tuan Anh Vu
(74) Attorney, Agent, or Firm—Amin, Turocy & Calvin, LLP

(57) ABSTRACT

A system and method is provided for facilitating and implementing an efficient mechanism for doing an interface dispatch. The system and method retrieves source code and performs a pre-execution or preparation stage prior to execution of the source code. During the pre-execution stage memory is allocated for class types, class method tables are formed and interface virtual tables are formed. A block of memory is also allocated for an interface map in the form of a vector having a plurality of slots. The system and method packs the interface map with references to the interface virtual table locations utilizing a comb-vector technique.

18 Claims, 11 Drawing Sheets

INTERFACE INVOKE MECHANISM

CROSS-REFERENCE TO RELATED APPLICATIONS

This application is a continuation of U.S. patent application Ser. No. 09/901,254, filed Jul. 9, 2001, and entitled INTERFACE INVOKE MECHANISM, the entirety of which is incorporated herein by reference.

TECHNICAL FIELD

The present invention relates generally to computer systems, and more particularly to a system and method for facilitating and implementing an interface dispatch.

BACKGROUND OF THE INVENTION

Recent trends in software have shifted to programming in object oriented languages. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one step further—the idea being many shapes, one interface. The third principle is inheritance, which allows developers to reuse pre-existing design and code. This capability allows developers to avoid creating software from scratch. Rather, through inheritance, developers derive subclasses that inherit behaviors which the developer then customizes to meet particular needs.

Certain object oriented programming languages (e.g., C++, C#, Java, COM) support a programming construct called an interface. An interface includes declarations of methods, constants and properties. The interfaces can be inherited or implemented by a class type. Classes can also implement one or more interfaces. Methods declared in an interface can only be implemented in a class, not in an interface. When a class implements an interface, it must implement every method in the interface and all other interfaces which the interface extends.

A class type can be converted to any of the interfaces it implements, with no change in the pointer referring to the class, only the compile-time type is affected. When a member function of an interface is called, a compiler, does not in general know the type of the underlying class type. Therefore, it cannot at compile time determine the address or virtual table slot within the class virtual table of the method to call. The interface call code generated by the compiler must locate the class method implementing the interface method at runtime. In the implementation of interfaces, there is typically a virtual table for each interface implemented by a class type. Therefore, the problem reduces to finding that virtual table for the actual runtime class type and calling through that virtual table using the known virtual slot number of the method called. This is referred to as an interface dispatch.

The general problem is reduced to implementing an efficient mechanism in both space and speed for performing an interface dispatch. Conventional solution include providing a number of look ups through secondary data structures. These solutions are slow and utilize a tremendous amount of memory in building tables. One possible solution is to have each class type contain a list of pairs (interface type, interface virtual table) for all the interface types that it implements, and to search that list at runtime whenever an interface call is made. This solution is slow for two reasons: first, because the search code is large enough that it can't reasonably be expanded inline, so there is overhead for an additional call to a helper function, second because the search is sequential. The second source of overhead can of course be addressed by fancier searching schemes—hashing, some sort of caching the entry last found, or moving popular entries to the front. Another solution is to search a compact data structure at the time of the call. Still, these schemes are likely to be much slower compared to a virtual call.

A faster solution is to assign an index to both class and interface types. To find a given interface associated with a class, a lookup is made in a rectangular matrix where the rows are indexed by class indices and the columns by interface indices. This solution uses a lot of memory because while there are many classes and interfaces, classes do not implement many interfaces, so the matrix will be quite sparse. Unused entries in the matrix will never be referenced by compiler-generated code. When classes and interfaces are loaded dynamically, the matrix would also have to be grown dynamically. Therefore, there is an unmet need in the art for a more efficient mechanism for interface dispatching.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A system and method is provided for facilitating and implementing an efficient mechanism for doing an interface dispatch. Code is loaded prior to runtime and interface virtual tables are created for each interface implemented by a class type. The system and method allocates a block of memory for an interface map in the form of a vector having a plurality of slots to create a compact table associated with indirectly locating interface virtual tables associated with a particular class type. The system and method then packs the interface map with references (e.g., indices, unique identification numbers, pointers) to the interface virtual table locations utilizing a comb-vector technique. The comb-vector technique comprises determining a row structure of a class type based on the interfaces implemented by the class type and an index number assigned to the interfaces. The comb-vector technique then associates the indices with slots in the interface map and stores reference to the interface virtual tables in the slots based on the configuration of the row structure for the class type. A row start location into the interface map is then stored in a method table for the class type. This is repeated for each class type, such that another row structure is slid down in memory until all relevant entries within a row structure hit empty or "don't care" entries within the interface map.

During runtime, an address for a call to an interface can be quickly resolved by accessing the row start location in the method table for a particular class type and then adding the index of the interface to the row start location to find the correct slot in the interface map. The slot can then be accessed to determine the address of the interface virtual table. The correct method can then be found in the interface virtual table and the method executed.

To the accomplishment of the foregoing and related ends, the invention then, comprises the features hereinafter described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

DETAILED DESCRIPTION OF THE INVENTION

Dynamic fields exist separately in every instance of a class type, and dynamic methods operate on specific instances of a class through a "this pointer". The "this pointer" points to an object instance that is a data structure having a base memory location (offset location 0) that contains a pointer to a first block of memory containing a data structure referred to as a method table that allows rapid access to dynamic methods implemented by a class hierarchy that includes a class for the object and any additional super classes that form the class hierarchy for the object. Typically, access to methods for objects of similar types are through similar method tables for object instances of each class. Additionally, interface virtual tables are built for accessing methods of interfaces that classes implement. An interface virtual table will exist for each interface implemented in each class type. The present invention provides for a system and method for facilitating access to methods referenced in interface virtual tables for a given class type.

Concerning interfaces, classes not related by inheritance may, nevertheless, share common functionality. For example, many classes may contain methods for saving their state to and from permanent storage. For this purpose, classes not related by inheritance may support interfaces allowing programmers to code for the classes' shared behavior based on their shared interface type and not their exact types. Thus, as used in this application, the term "interface" refers to a partial specification of a type. It is a contract that binds implementers to provide implementations of the methods contained in the interface. Object types may support many interface types, and many different object types would normally support an interface type. By definition, an interface type can never be an object type or an event type. Interfaces may extend other interface types. Thus, an interface may contain, for example, methods (both class and instance), static fields, properties and events. However, unlike an object, an interface cannot obtain instance fields.

The present invention is now described with reference to the drawings. A system and method is provided for facilitating and implementing an efficient mechanism for doing an interface dispatch. The system and method retrieves source code and performs a pre-execution or preparation stage prior to execution of the source code. During the pre-execution stage memory is allocated for class types, class method tables are formed and interface virtual tables are formed. A block of memory is also allocated for an interface map in the form of a vector having a plurality of slots. The system and method packs the interface map with references to the interface virtual table locations utilizing a comb-vector technique.

Figure 1:
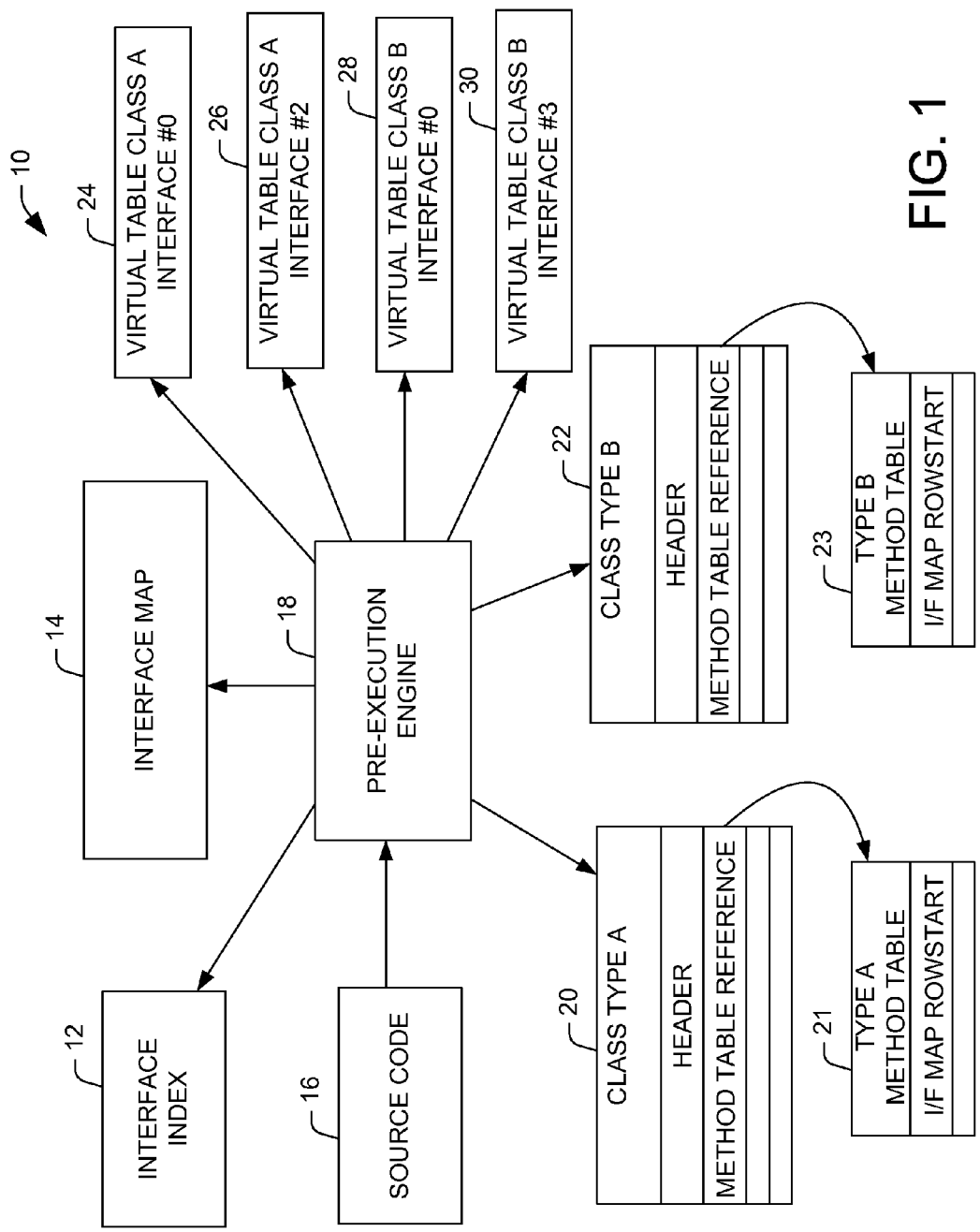
FIG. 1 illustrates a block diagram of a system for facilitating interface dispatching in accordance with one aspect of the present invention.

FIG. 1 illustrates an example of a system 10 for facilitating interface dispatching. Source code 16 is accessed prior to execution by a pre-execution engine 18. The pre-execution engine performs a preparation stage on the source code prior to execution of the source code. The preparation stage includes the preparation of data structures that make execution of the compiled code more efficient. The preparation stage can include the setting up of efficient mechanisms for accessing those methods when the code requires such access rather than taking the time to calculate the address each time an object of a certain class type is encountered. The pre-execution engine can be a loader, a linker, a compiler, an interpreter or a JIT (Just-In-Time) compiler. Alternatively, the pre-execution engine 18 can be a combination of any of the above. The pre-execution engine 18 performs a variety of functions on the source code 16 prior to execution of the source code 16. The source code 16 can be completely compiled prior to execution and/or portions of the source code 16 can be dynamically loaded by the pre-execution engine 18 prior to execution.

In the example of FIG. 1, the pre-execution engine 18 allocates memory for a first class type 20 or object of a class type A and a second class type 22 or object of a class type B. It is to be appreciated that the example of the first class type 20 and the second class type 22 are for illustrative purposes, since most application programs can have tens, hundreds and thousands of instances of different class types generated during pre-execution of source code 16.

As class types are encountered in the code, the pre-execution engine 18 allocates a block of memory for each object of those class types. The pre-execution engine 18 creates a method table 21 for class type A and a method table 23 for type B. The method table 21 can be employed by all objects of type A, while the method table 23 can be employed by all objects of type B. A method table reference is inserted into a header of the class instance or object and initialized. The method table reference points at a base location of a first block of memory defining the dynamic methods for that specific class type. The pre-execution engine 18 also initializes other data unique to each instance at offsets relative to the method table reference. A map row start pointer is inserted into the method table, which points to a location in an interface map 14 generated by the pre-execution engine 18. It is to be appreciated that various methodologies can be employed to access the desired interface address location in an efficient manner. The pre-execution engine 18 allocates a block of memory for the interface map 14 in the form of a vector. The interface map 14 is then filled with address locations of interface virtual tables based on class types using a comb-vector technique.

As the pre-execution engine 18 is encountering class types, it is also encountering interfaces implemented by those class types. When a new interface is encountered, it is assigned a unique identification number and a new index number by an interface index component 12. Alternatively, the interface index numbers can be assigned by the pre-execution engine 18 and stored in the interface index 12. An interface virtual table is created by the pre-execution engine 18 that contains references to methods for the interfaces for each interface implemented in a class type. Although the present example illustrates separate interface virtual tables for similar interfaces in different class types, a single virtual table can be provided for similar interfaces in different class types.

In the present example, class type A 20 implements interface 0 and interface 2 and class type B 22 implements interface 0 and interface 3. The pre-execution engine 18 then creates an interface virtual table 24 for class A type implementations of interface 0, an interface virtual table 26 for class A type implementations of interface 2, an interface virtual table 28 for class B type implementations of interface 0 and an interface virtual table 30 for class B types implementation of interface 3. Although, the interface virtual tables are illustrated in a different memory location than the method tables, the interface tables can reside within the method tables. For example, the interface virtual table 24 and the interface virtual table 26 can reside in the method table 21, while the interface virtual table 28 and the interface virtual table 30 can reside in the method table 23.

The interface map 14 is comprised of a plurality of slot locations that contain references to the interface virtual tables. The interface virtual tables contain references to all the methods implemented by that particular interface. When a new class type is encountered, a row structure is determined based on the interfaces implemented by that class type. The interface map is packed using a comb-vector technique. For example, once all of the interfaces for a given class type are determined, a row structure is defined by determining a row start location and offsets from the row start location based on the index assigned to a given interface. The row structure is then inserted in slots of the interface map 14 where entries are available and a start row slot location is assigned to that class type. The routine is repeated for each new class type. As a new class type is encountered and a new row structure determined for that new class type based on the interface implemented by the new class type, the routine looks within the interface map for empty or "don't care" entries wherever the new class type needs relevant interface entries. This can be accomplished by conceptually sliding the row for the class type within the interface map until all relevant entries within the row hit "don't care" entries within the interface map 14. The row start location for each class type is then inserted into the method table of each class type.

Figure 2:
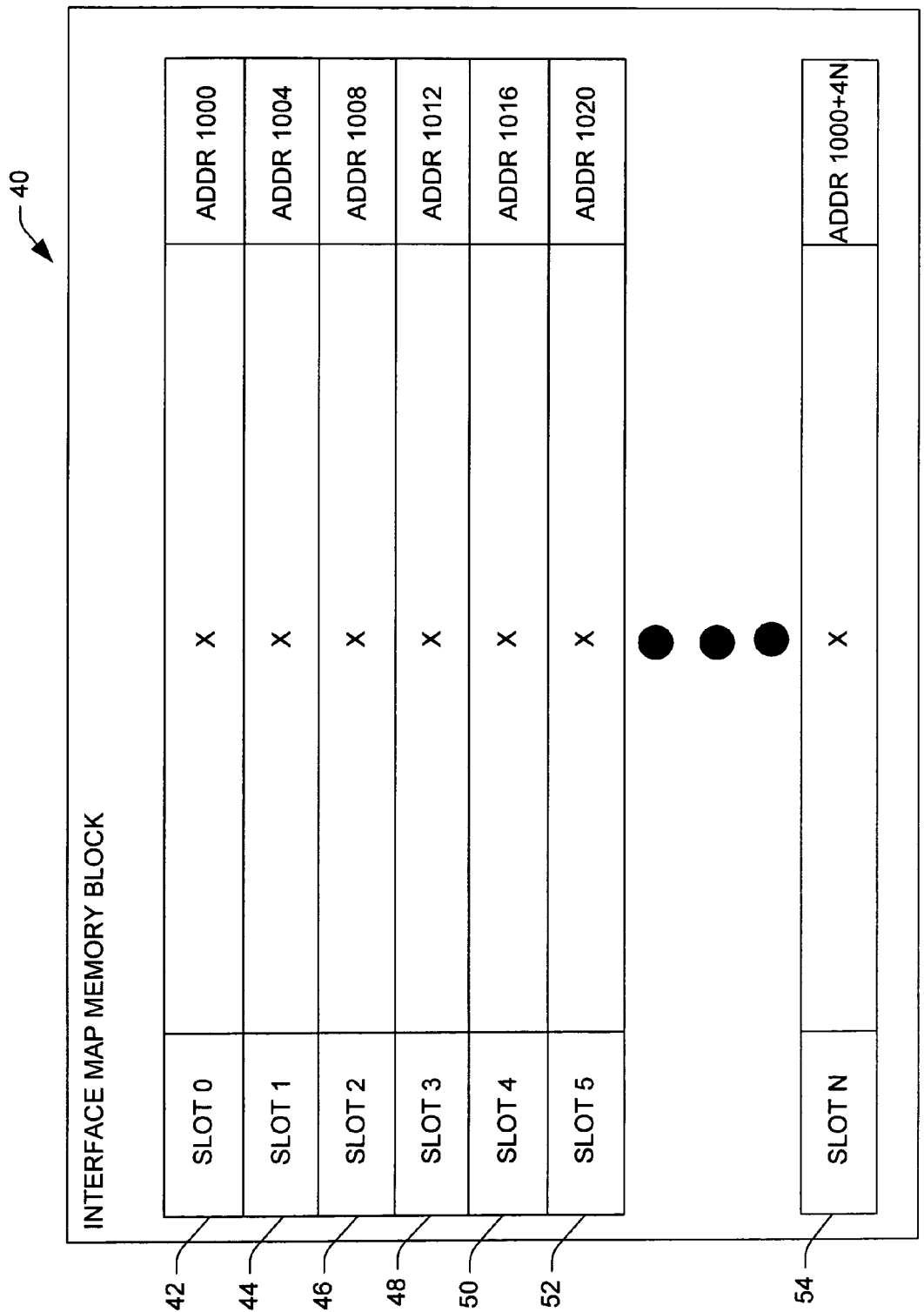
FIG. 2 illustrates a block diagram of a memory map prior to loading of interface references in accordance with one aspect of the invention.
Figure 3:
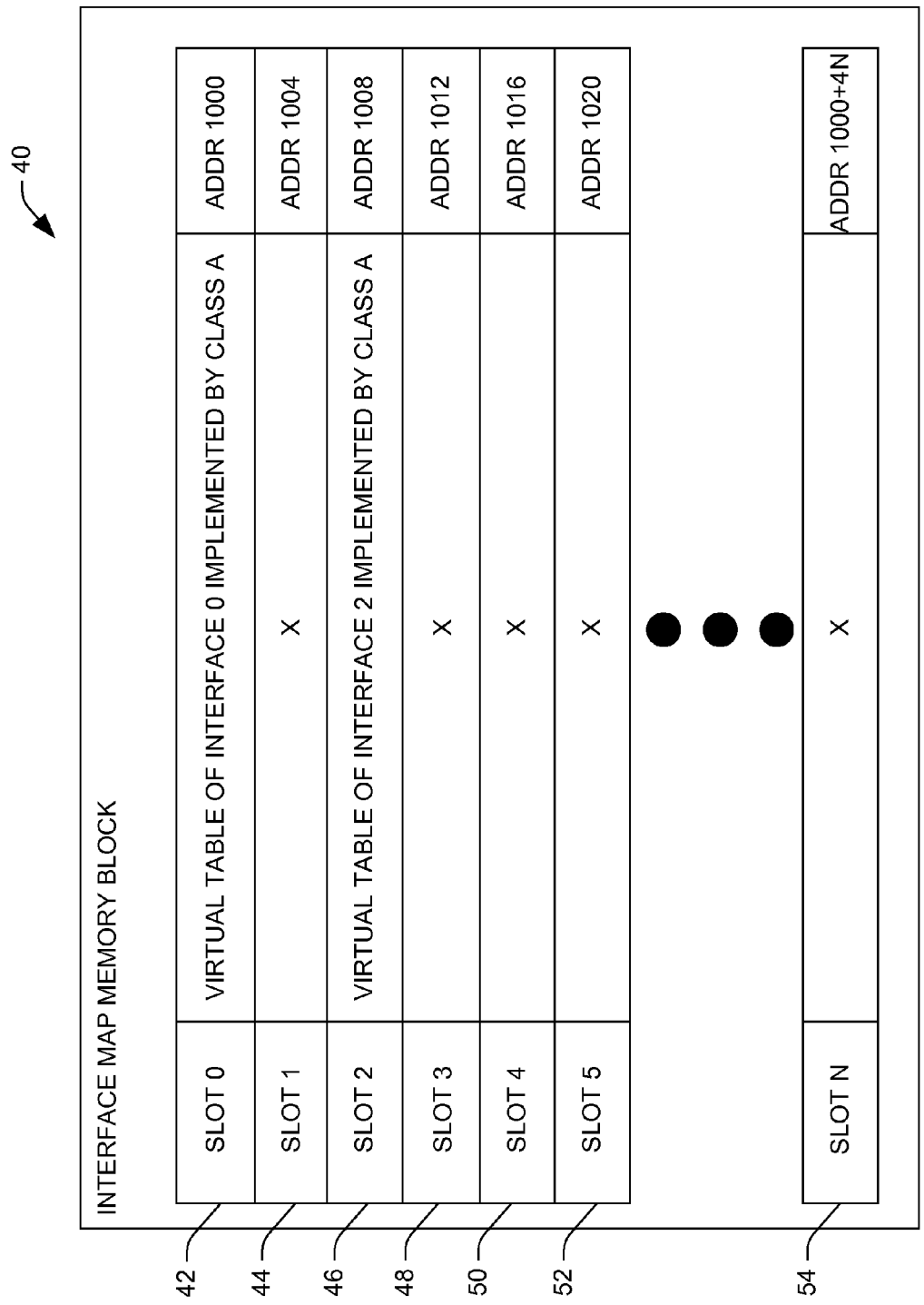
FIG. 3 illustrates a block diagram of the memory map of FIG. 2 after loading of interface references for a first class type in accordance with one aspect of the invention.
Figure 4:
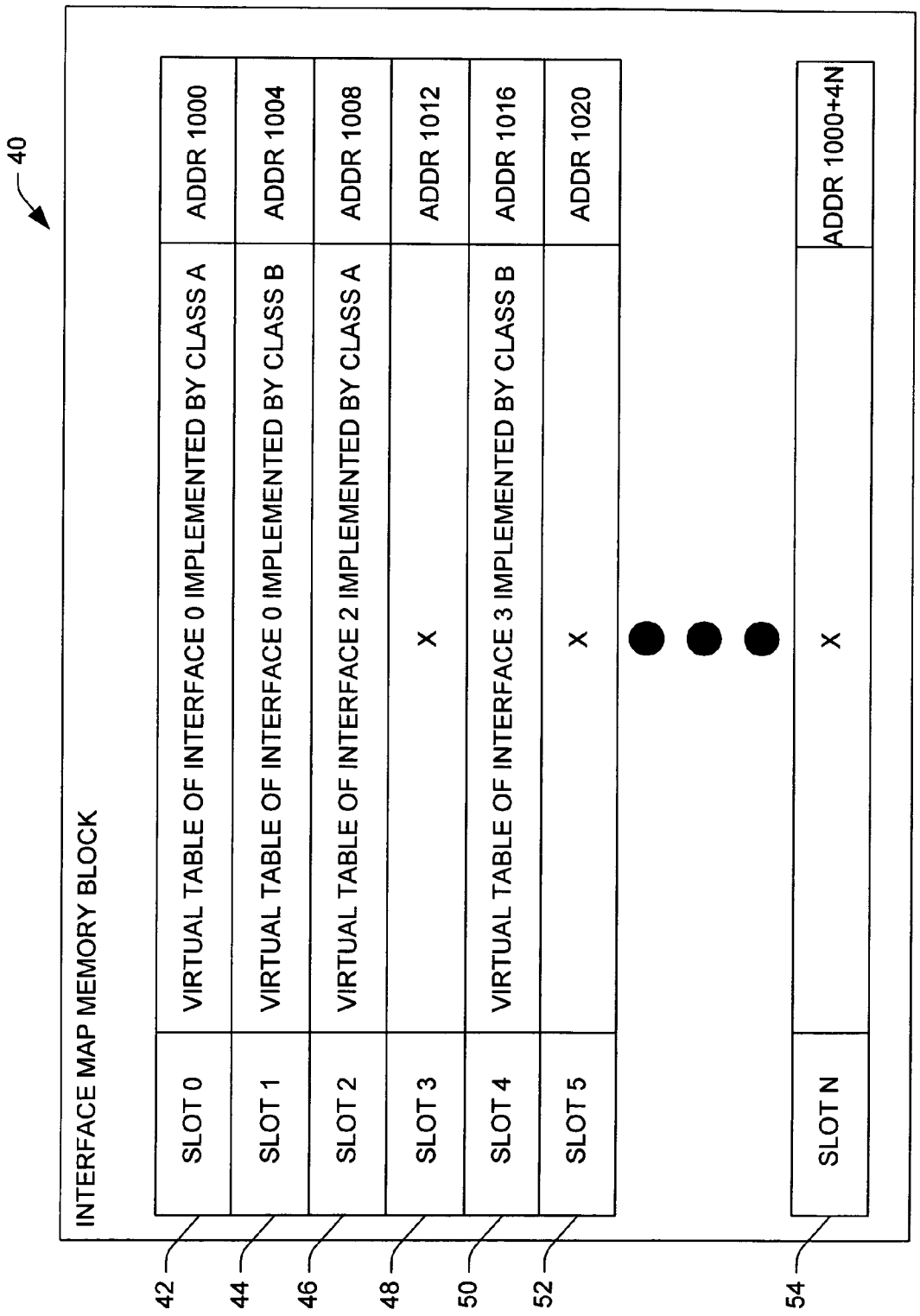
FIG. 4 illustrates a block diagram of the memory map of FIG. 3 after loading of interface references for a second class type in accordance with one aspect of the invention.

FIGS. 2-4 illustrate an example of the comb-vector technique for packing an interface map with references to interface virtual tables in accordance with one aspect of the present invention. The example illustrates loading of two class types A and B, where class type A implements interfaces 0 and 2, and class type B implements interfaces 0 and 3. FIGS. 2-4 illustrate a block of memory 40 allocated for an interface map by the pre-execution engine 18. The block of memory 40 is comprised of a plurality of slots where the slot size on a 32-bit system is 4 bytes, but could be different on a 64-bit system. In the present example, the interface map memory block comprises a first slot 42 (slot 0) at address 1000, a second slot 44 (slot 1) at address 1004, a third slot 46 (slot 2) at address 1008, a fourth slot 48 (slot 3) at address 1012, a fifth slot 50 (slot 4) at address 1016, a sixth slot 52 (slot 5) at address 1020 up to an nth slot 54 (Slot N) at address 1000+4N.

FIG. 2 illustrates the memory map 40 prior to the loading of any interface and class references with "don't care" entries or empty slots noted by "X". FIG. 3 illustrates the interface memory map after the loading of a class of type A implementing interface 0 and interface 2. The index for interface 0 is assigned 0 and the index for interface 2 is assigned 2. A pre-execution engine determines a row with a first interface at a first slot and a second interface at a slot 2 away from the first slot. Since, the memory map is empty, the pre-execution engine assigns a row start for class type A at slot 0. Therefore, the address to the class type A interface 0 virtual table is inserted in slot 0 and the address of the class type A interface 2 virtual table is 0+(2*4) and inserted in slot 2.

FIG. 4 illustrates the interface memory map 40 after the loading of a class of type B implementing interface 0 and interface 3. The index for interface 0 is assigned 0 and the index for interface 3 is assigned 3. The pre-execution engine determines a row with a first interface at a first slot and a second interface at a slot three away from the first slot. Since, the memory map contains entries at slot 0 and slot 2 for class of type A, the pre-execution engine slides the class type B row down in memory and assigns a row start for class type B at slot 1. The index for interface 0 is assigned 0 and the index for interface 3 is assigned 3. Therefore the address to the class type B interface 0 virtual table is inserted in slot 1 and the address of the class type B interface 3 virtual table is 0+(3*4) and inserted in slot 3.

It is to be appreciated that loading the interface entries for class type B does not disturb the entries for class type A in any way, in fact, at runtime other threads can make calls to the interface methods for classes of type A while class type B is being loaded. Therefore, no runtime synchronization mechanisms are necessary for making calls via this mechanism. On the other hand, loading new classes or interfaces needs to be properly synchronized. The present example illustrates assigning indices to interfaces sequentially for the purposes of simplicity although a variety of other methodologies can be employed to assign indices and still fall within the scope of the present invention.

Figure 5:
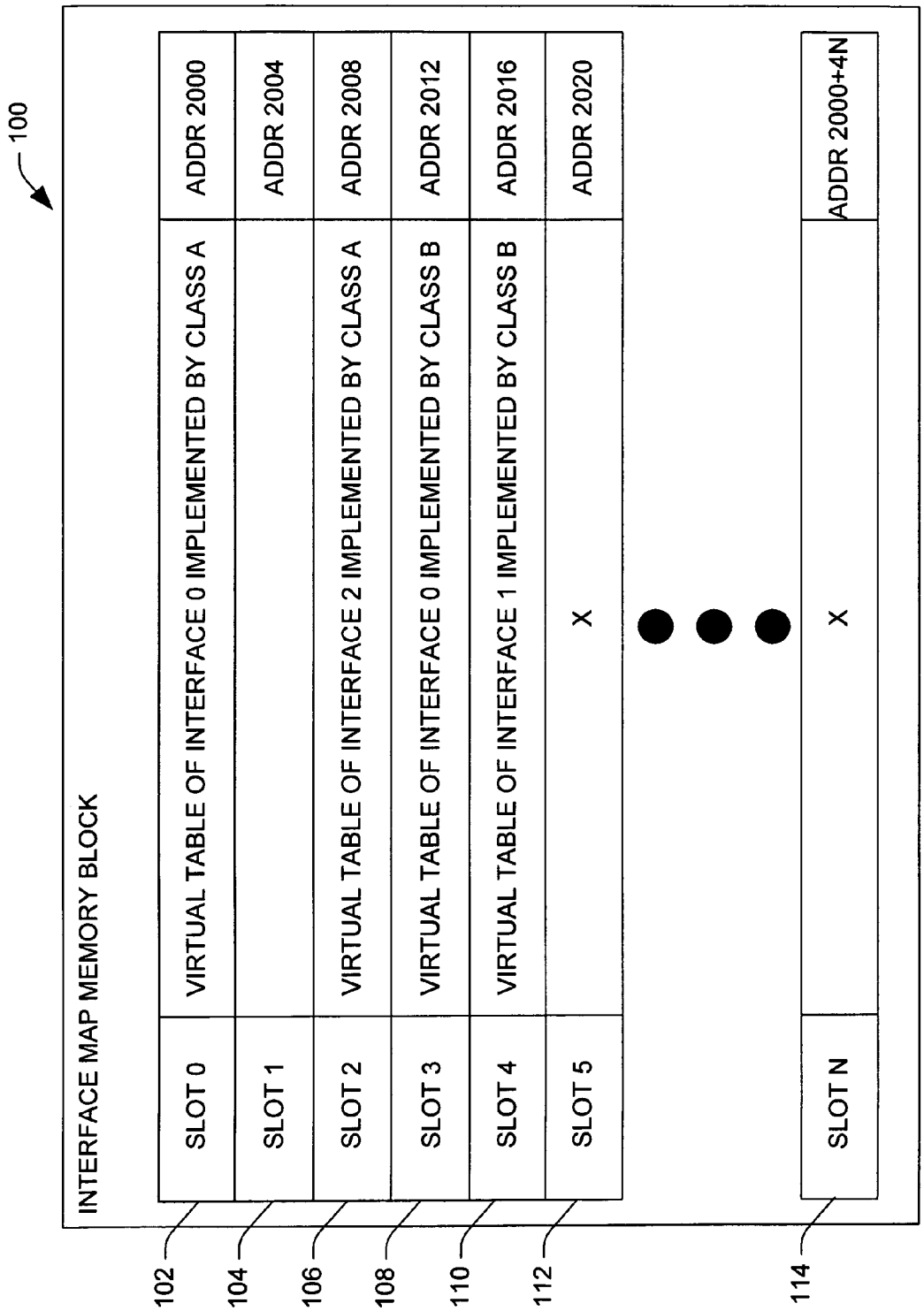
FIG. 5 illustrates a block diagram of the memory map packed according to a comb-vector technique in accordance with one aspect of the invention.

FIG. 5 illustrates an example of the comb-vector technique for packing an interface map when a collision occurs between two rows in accordance with one aspect of the present invention. The example illustrates loading of two class types A and B, where class type A implements interfaces 0 and 2, and class type B implements interfaces 0 and 1. FIG. 5 illustrates a block of memory 100 allocated for an interface map by a pre-execution engine. The block of memory 100 is comprised of a plurality of slots where the slot size on a 32-bit system is 4 bytes. In the present example, the interface map memory block 100 comprises a first slot 102 (slot 0) at address 2000, a second slot 104 (slot 1) at address 2004, a third slot 106 (slot 2) at address 2008, a fourth slot 108 (slot 3) at address 2012, a fifth slot 110 (slot 4) at address 2016, a sixth slot 112 (slot 5) at address 2020 up to an nth slot 114 (Slot N) at address 2000+4N.

FIG. 5 illustrates the memory map after the loading of a class of type A implementing interface 0 and interface 2 and a class of type B implementing interface 0 and interface 1. The index for interface 0 is assigned 0 and the index for interface 2 is assigned 2. The pre-execution engine determines a row with a first interface at a first slot and a second interface at a slot 2 away from the first slot. Since, the memory map is empty, the pre-execution engine assigns a row start for class A at slot 0. Therefore, the address to the class type A interface 0 virtual table is inserted in slot 0 and the address of the class type A interface 2 virtual table is 0+(2*4) and inserted in slot 2. A class of type B is then loaded implementing interface 0 and interface 1. The index for interface 0 is assigned 0 and the index for interface 1 is assigned 1. The pre-execution engine determines a row with a first interface at a first slot and a second interface at a slot one away from the first slot. Since, the memory map contains entries at slot 0 and slot 2 for class type A, the pre-execution engine slides the class type B row down in memory and determines that assigning a row start at slot 1 will cause a collision in slot 2 since that slot has already been assigned. The pre-execution engine then slides the row down in memory until it finds an opening in slots 3 and 4. The pre-execution engine then assigns a row start for class type B at slot 3. Therefore, the address to the class type B interface 0 virtual table is inserted in slot 3 and the address of the class type B interface 1 virtual table is 0+(1*4) and inserted in slot 4.

Figure 6:
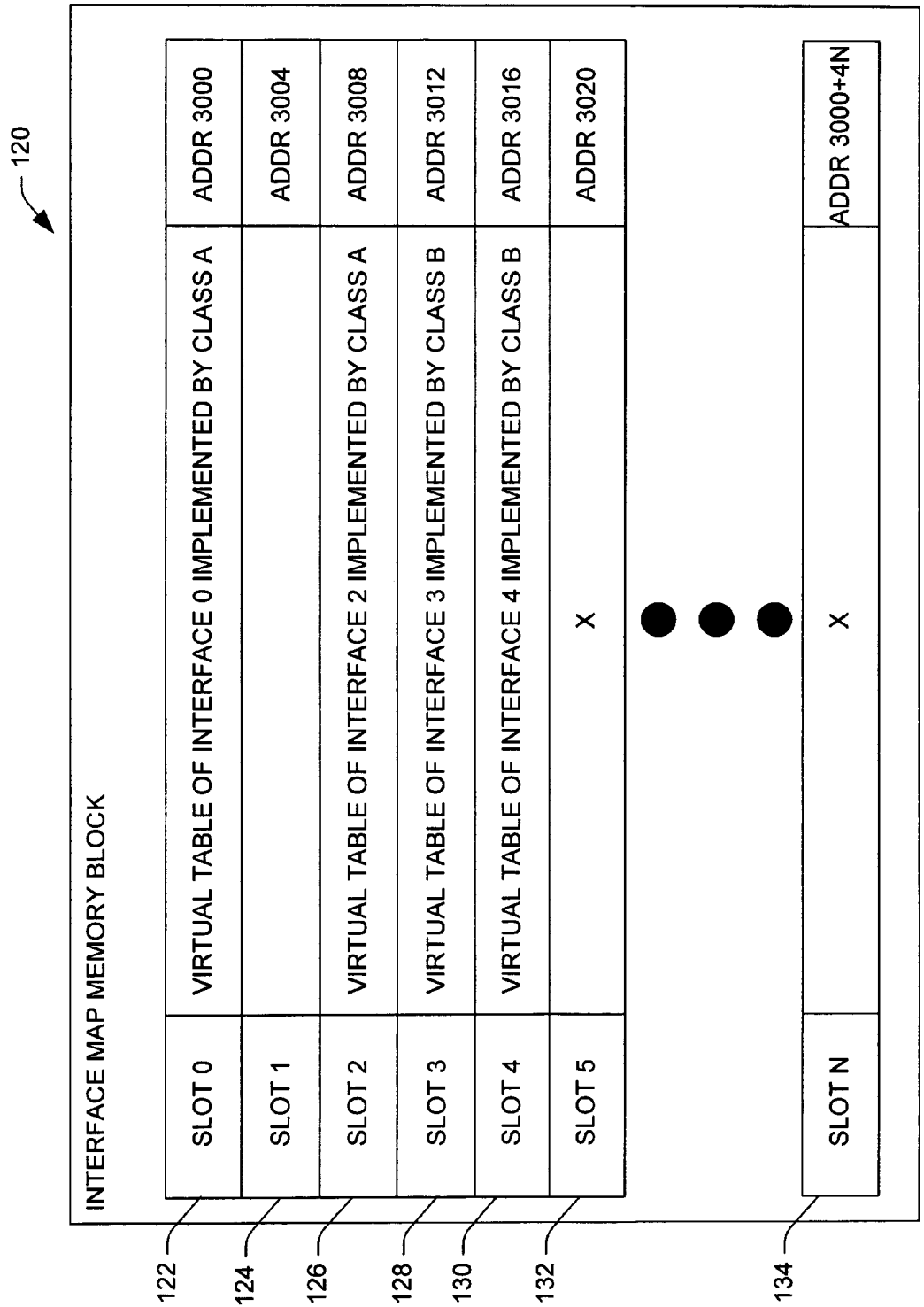
FIG. 6 illustrates a block diagram of the memory map packed according to a comb-vector technique using the same row start location of two different class types in accordance with one aspect of the invention.

FIG. 6 illustrates an example of the comb-vector technique for packing an interface map when two classes employ the same row start location in accordance with one aspect of the present invention. The example illustrates loading of two class types of A and B, where class type A implements interfaces 0 and 2, and class type B implements interfaces 3 and 4. FIG. 6 illustrates a block of memory 120 allocated for an interface map by a pre-execution engine. The block of memory 120 is comprised of a plurality of slots where the slot size on a 32-bit system is 4 bytes. In the present example, the interface map memory block 120 comprises a first slot 122 (slot 0) at address 3000, a second slot 124 (slot 1) at address 3004, a third slot 126 (slot 2) at address 3008, a fourth slot 128 (slot 3) at address 3010, a fifth slot 130 (slot 4) at address 3016, a sixth slot 132 (slot 5) at address 3020 up to an nth slot 134 (Slot N) at address 3000+4N.

FIG. 6 illustrates the memory map after the loading of a class of type A implementing interface 0 and interface 2 and a class of type B implementing interface 3 and interface 4. The index for interface 0 is assigned 0 and the index for interface 2 is assigned 2. The pre-execution engine determines a row with a first interface at a first slot and a second interface at a slot 2 away from the first slot. Since, the memory map is empty, the pre-execution engine assigns a row start for class type A at slot 0. Therefore, the address to the class type A interface 0 virtual table is inserted in slot 0 and the address of the class type A interface 2 virtual table is 0+(2*4) and inserted in slot 2. A class of type B is then loaded implementing interface 3 and interface 4. The index for interface 3 is assigned 3 and the index for interface 4 is assigned 4. The pre-execution engine determines a row with a first interface at a first slot and a second interface at a slot one away from the first slot with a row start three away from the first slot. Since, the memory map contains entries at slot 0 and slot 2 for class A, the pre-execution engine slides the class type B row down in memory to fill any empty slots. Since class type B does not contain an interface 0, a row start can be assigned at slot 0 without a collision. The address to the class type B interface 3 virtual table is inserted in slot 3 and the address of the class type B interface 4 virtual table is inserted in slot 4.

The interface map described above has to be allocated with a certain finite size, so it is possible to eventually run out of space if enough classes are loaded. In one aspect of the invention, additional interface maps can be employed by using a pointer to the start of the interface map for a class type without disturbing the mappings for class types already loaded, and without incurring additional runtime cost for the interface calls. One additional complication in the context of the certain systems that employ objects that are proxies for COM objects. These proxies conceptually implement all loaded interfaces. In one aspect of the invention, this is handled by having the method tables for the proxy objects all point a common interface map or vector that contains entries for all interfaces for COM objects, which is separate from the one for normal classes. The virtual tables pointed at by this separate interface vector in turn point to generic implementations for the interface methods, which take care of the interoperation details before calling the actual COM implementations in native code.

Figure 7:
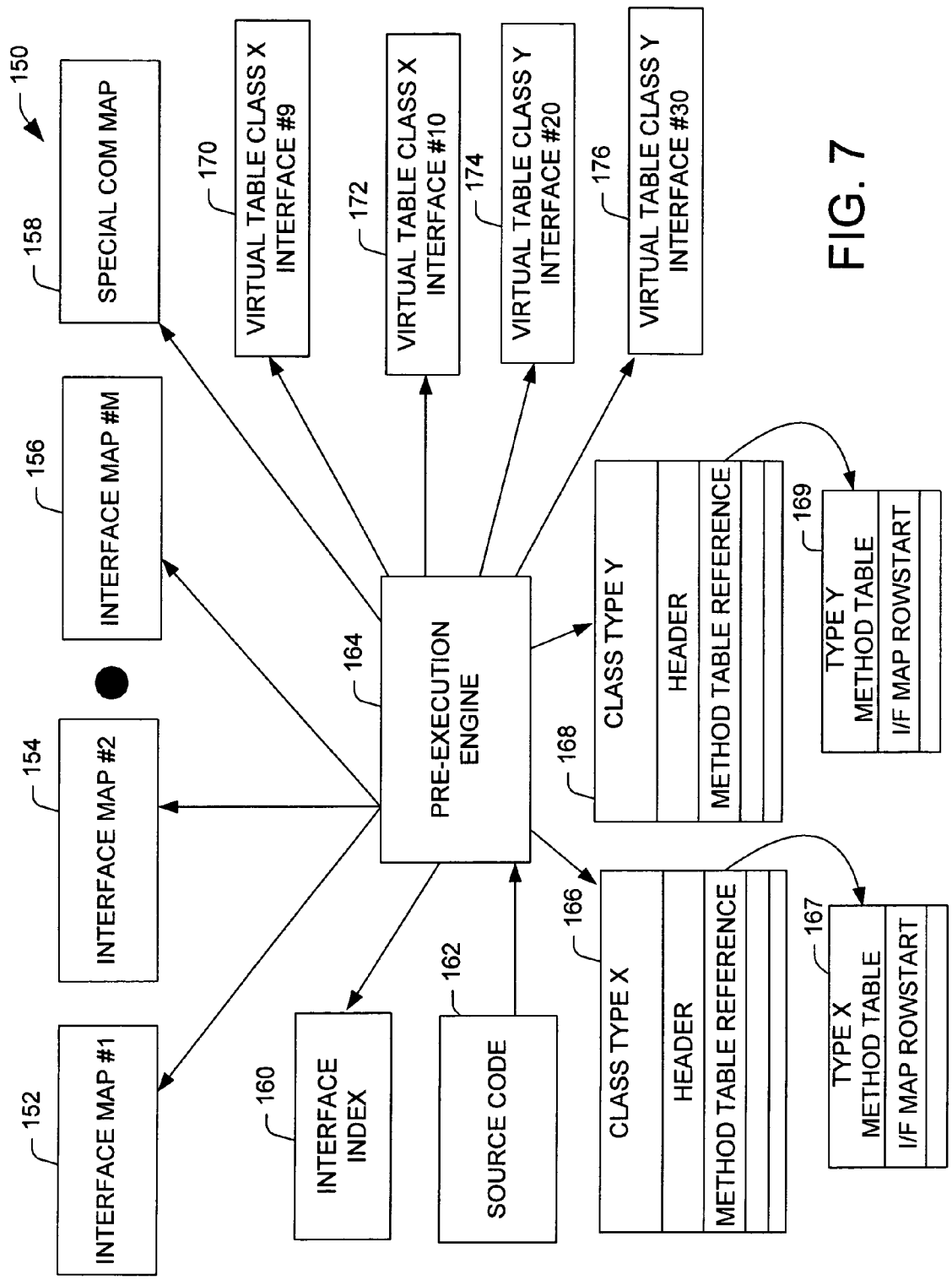
FIG. 7 illustrates a block diagram of a system for facilitating interface dispatching and dynamically creating additional interface maps in accordance with one aspect of the present invention.

FIG. 7 illustrates an example of a system 150 for facilitating interface dispatching taking in the special considerations when a first interface map has filled up in addition to the special situation of dealing with COM components. Source code 162 is accessed prior to execution by a pre-execution engine 164. The pre-execution engine 164 can be a loader, a linker, a compiler, an interpreter or a JIT (Just-In-Time) compiler. Alternatively, the pre-execution engine 164 can be a combination of any of the above. In the example of FIG. 7, the pre-execution engine 164 allocates memory for a first class type 166 or object of type X and a second class type 168 or object of class Y.

As object instances are created, a block of memory is allocated for each instance and the object instantiated. The pre-execution engine 164 has previously created (or now creates) the method table 167 for class type X and the method table 169 for class type Y. The method table 167 can be employed by all objects of type X, while the method table 169 can be employed by all objects of type Y. A method table reference is inserted into a header of the object and initialized when the object is created. The method table reference points at a base location of a first block of memory defining the dynamic methods for that specific class type. The pre-execution engine 164 also initializes other data unique to each instance at offsets relative to the method table reference. A map row start pointer is inserted into the method table, which points to a location in an interface map generated by the pre-execution engine 164.

As the pre-execution engine is encountering class types, it is also encountering interfaces implemented by those class types. When a new interface is encountered, it is assigned a new index by an interface index component 160 or the pre-execution engine 164 and retained in the interface index 160. An interface virtual table containing references to methods for the interfaces is also created by the pre-execution engine 164 for each interface implemented in a class type. Separate virtual tables are provided for similar interfaces in different class types. In the present example, class type X 166 implements interface 9 and interface 10 and class type Y 168 implements interface 20 and interface 30. The pre-execution engine 164 then creates a virtual table 170 for class X type implementation of interface 9, a virtual table 172 for class X type implementation of interface 10, a virtual table 174 for class Y type implementation of interface 20 and virtual table 176 for class Y type implementation of interface 30. The pre-execution engine 164 generates a first interface map 152. The interface map 152 is comprised of a plurality of slot locations that contain references to the interface virtual tables. The interface virtual tables contain references to all the methods implemented by that particular interface.

The interface map is packed using a comb-vector technique as discussed in FIG. 1. Once the first interface map 152 is filled, the pre-execution engine 164 can generate a second interface map 154 and continue generating interface maps as they get filled up to a Mth interface map 156. The pre-execution engine 164 also generates a special COM map 158. The special COM map 158 is a dummy map that allows an execution engine to access a virtual table of a COM object prior to determining if the object is a COM object. Once it is determined that an object is a COM object, a QueryInterface can be used to determine if a COM object supports an interface.

Figure 8:
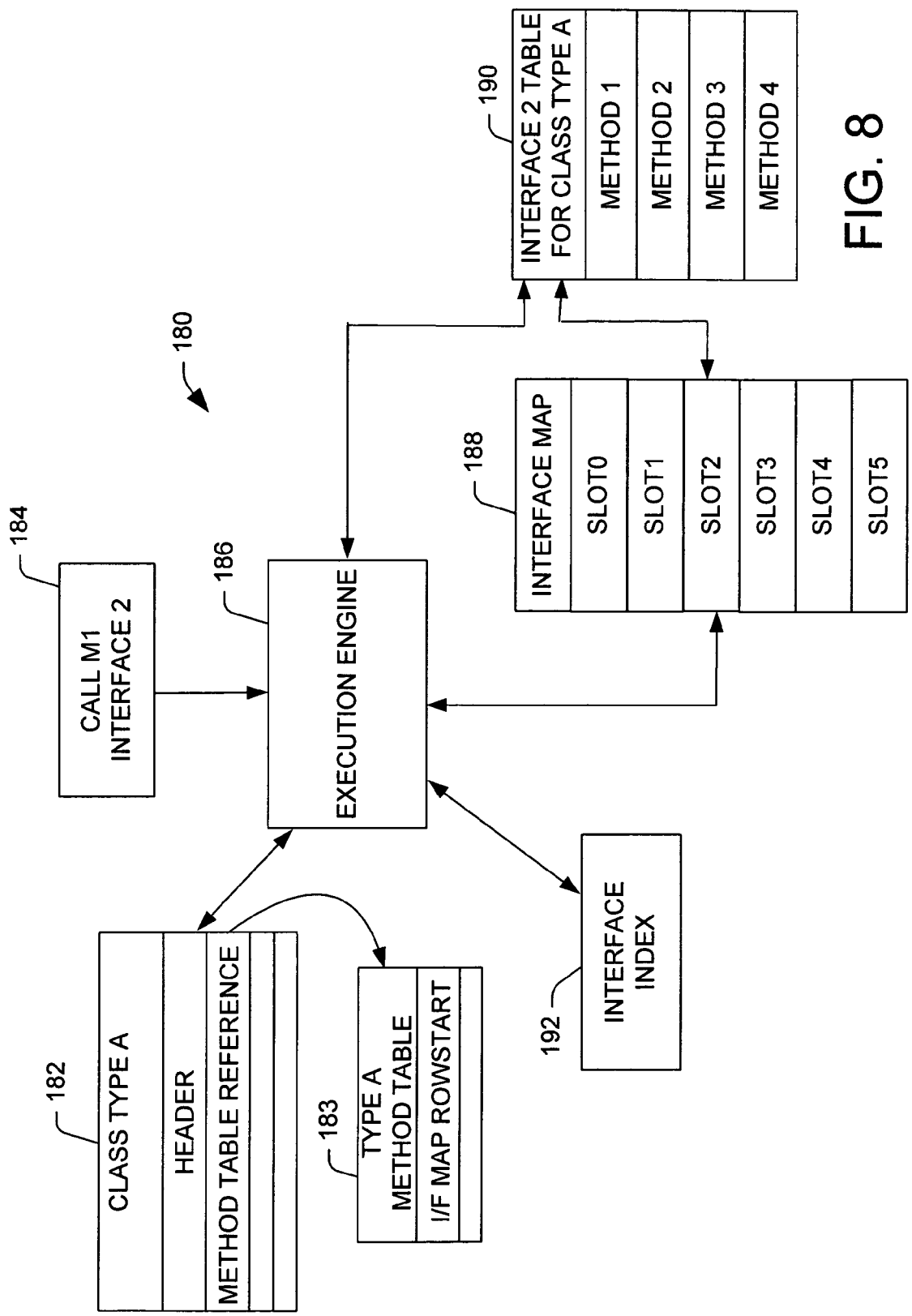
FIG. 8 illustrates a block diagram of a system for implementing an interface dispatch in accordance with one aspect of the present invention.

FIG. 8 illustrates a system for performing an interface dispatch after the preparation stage illustrated in FIG. 1 and FIG. 7. The system 180 comprises an execution engine 186 that receives a call 184 to a method M1 of an interface 2. The execution engine can be a compiler, a JIT compiler, a code manager or the like. The execution engine 186 determines the specific instance of the class of the call through a "this" pointer. The execution engine uses the "this" pointer to find a method table 183 for an object of class type A 182. The "this" pointer points to a header in the class type A 182. The header includes a pointer to the method table by adding a known offset relative to the "this" pointer. The execution engine 186 can then find the interface map row start in the method table 183, which points to a particular slot in an interface map 188 of the row structure for the class type and interface type. An index number offset can be retrieved from an interface index and added to the interface map row start to find the slot in the row structure containing the address pointing to the appropriate interface table 190. For example, the index number 2 (e.g., 2*4) is added to the row start located at slot 0 to obtain the address location of slot 2. Slot 2 then points to the interface table 190. The interface table 190 contains the methods for interface 2 implemented in class type A. The actual method 1 can be obtained again by indexing to the appropriate method within the interface table 190.

If the interfaces are loaded and assigned indices before any code is generated to call to any of their methods, the interface index is known to the compiler at compile time. Then the pseudo code performed by the execution engine is simplified to:

Interface_vtable=object->methodTable->interfaceMap [interfaceIndex]

The complete Intel x86 assembly code for an interface call becomes just the following four machine instructions (assuming the "this" pointer for the call has already been loaded into the ECX register):

| | |
|---|---|
| Mov eax,[ecx].methodTable | ;fetch the method table from the object |
| Mov eax,[eax].interfaceMap | ;fetch the interface map |

-continued

| | |
|---|---|
| Mov eax,[eax + interfaceIndex*4] | ;fetch the vtable (interfaceIndex is compile ;time constant!) |
| Call [eax + virtualSlot*4] | ; call via vtable |

The present invention also provides a mechanism for speeding up casts of class types to interfaces by using the same data structure already present for the interface calls, provided that the virtual tables for the interfaces implemented by a class are contained within the virtual table for the class itself. In order to check for a class type to be cast able to an interface, a check is made to whether the class implements that interface. This can be accomplished by checking that the interface map entry for that interface and class does indeed point within the virtual table for the class. In pseudo code the virtual table for the interface can be fetched just like for a call:

Class_vtable=object=>method Table
Interface_vtable=Class_vtable->interfaceMap[interfaceIndex]

Then a check can be performed to determine whether the interface lies within the virtual table for the class:

Cast_legal=(Interface_vtable>=Class_vtable)&&
(Interface_vtable<Class_vtable+size of(Class_vtable))

Figure 9:
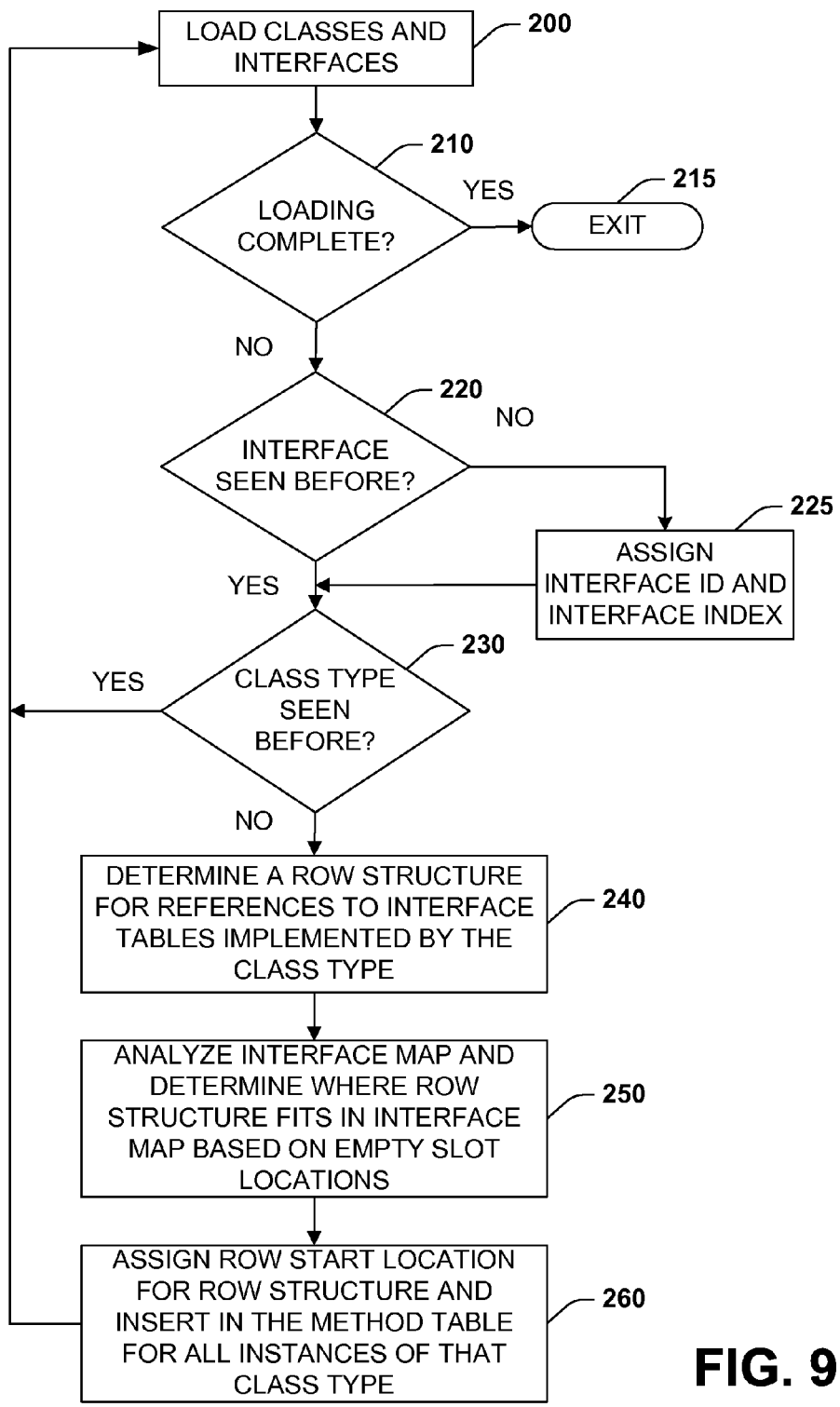
FIG. 9 illustrates a flow diagram of a methodology for packing an interface map utilizing a comb-vector technique in accordance with one aspect of the present invention.
Figure 10:
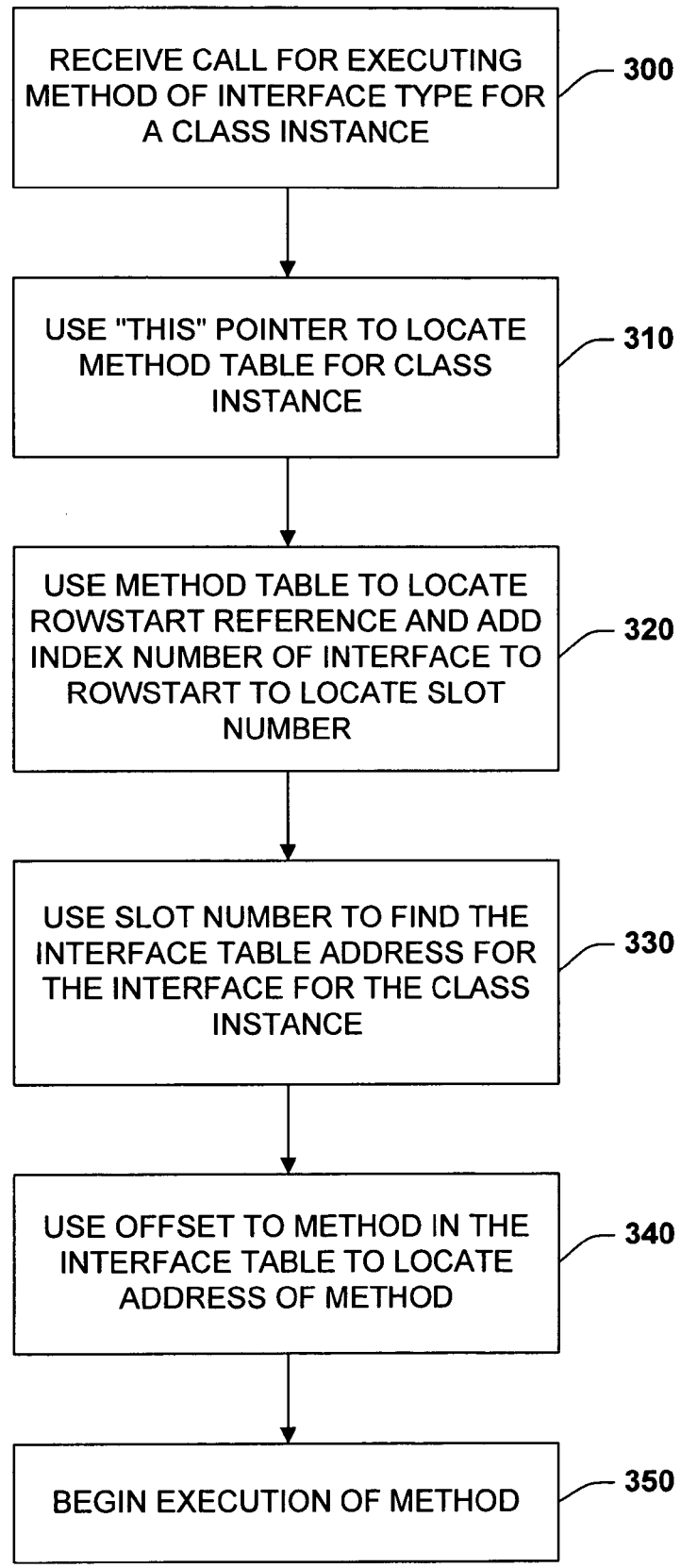
FIG. 10 illustrates a flow diagram of a methodology for implementing an interface dispatch in accordance with one aspect of the present invention.

In view of the foregoing structural and functional features described above, a methodology in accordance with various aspects of the present invention will be better appreciated with reference to FIGS. 9-10. While, for purposes of simplicity of explanation, the methodology of FIGS. 9-10 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention. It is further to be appreciated that the following methodology may be implemented as computer-executable instructions, such as software stored in a computer-readable medium. Alternatively, the methodology may be implemented as hardware or a combination of hardware and software.

FIG. 9 illustrates one particular methodology for creating an interface map containing references to interface virtual tables based on class types in accordance with the present invention. The methodology begins at 200 where source code begins loading classes and interfaces during a preparation stage by a loader/linker, an execution engine, a compiler, interpreter or the like. At 210, it is determined if the loading stage has been completed. If the loading stage has been completed (YES), the methodology proceeds to 215 and exits the loading stage. If the loading stage has not been completed (NO), the methodology advances to 220. At 220, an interface is received and it is determined if the interface has been previously seen. The interface can be received during the loading of a class or during a loading of the interface itself. If the interface has not been previously seen (NO), the method proceeds to 225 and assigns an interface ID and an interface index to the interface before advancing to 230. If the interface has been previously seen (YES), the methodology advances directly to 230.

At 230, a class is received and it is determined if the class type has been previously seen. If the class type has been previously seen (YES), the method returns to 200 to continue loading classes and interfaces. If the class type has not been previously seen (NO), the method advances to 240. At 240, a row structure is determined for references to interface virtual tables implemented by the class type. The method then proceeds to 250 to analyze the interface map and determine where the row structure fits in the interface map based on available empty locations. The method then advances to 260 where the row start location for the row structure is determined and the row structure inserted into the interface map. The row start location can then be inserted into the method table for the class type.

FIG. 10 illustrates a methodology for performing an interface dispatch by accessing the comb-vector packed interface map in accordance with one aspect of the present invention. The methodology begins at 300 where a call is received for executing a method of an interface type implemented by a certain class instance. The "this" pointer is used to locate a pointer in the header of an object referencing the method table for the class type at 310. The method then advances to 320 where the method table is employed to locate the row start reference of the interface map. The interface index number is added to the row start address to locate the slot number corresponding to the interface in the call. At 330, the address in the slot number is used to locate the interface virtual table corresponding to the interface in the call. An offset is then used to locate the address of the method in the interface for execution at 340. At 350, execution of the method begins.

Figure 11:
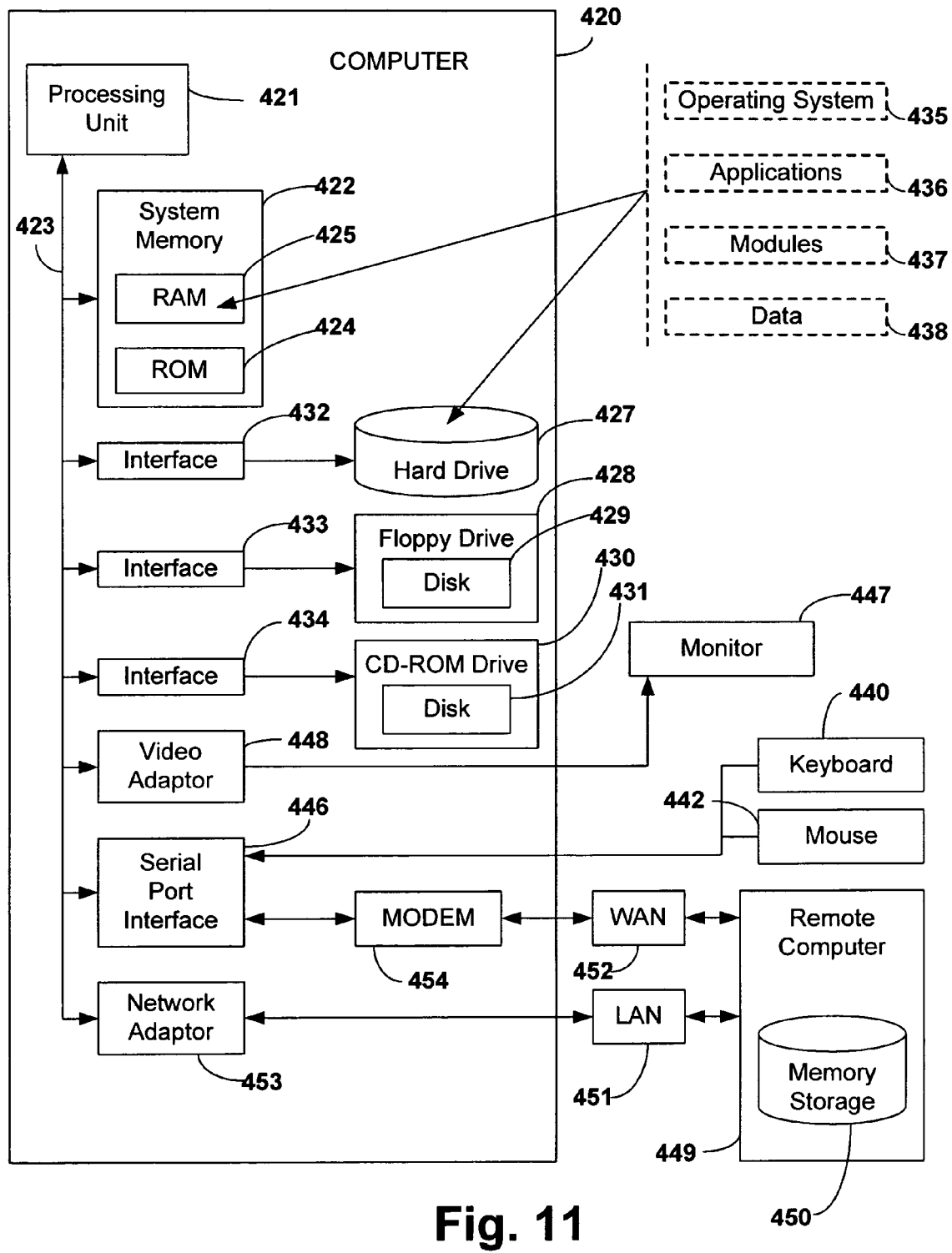
FIG. 11 illustrates a block diagram of a computer system in accordance with an environment of the present invention.

With reference to FIG. 11, an exemplary system for implementing the invention includes a conventional personal or server computer 420, including a processing unit 421, a system memory 422, and a system bus 423 that couples various system components including the system memory to the processing unit 421. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 421.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the server computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 425, including an operating system 435, one or more application programs 436, other program modules 437, and program data 438. A user may enter commands and information into the computer 420 through a keyboard 440 and pointing device, such as a mouse 442. Other input devices (not shown) may include a microphone, joystick, game pad, satellite dish, scanner, or the like. These and other input devices are often connected to the processing unit 421 through a serial port interface 446 that is coupled to the system bus, but may be connected by other interfaces, such as a parallel port, game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote server or client computer 449. The remote computer 449 may be a workstation, a server computer, a router, a peer device or other common network node, and typically includes many or all of the elements described relative to the computer 420, although only a memory storage device 450 has been illustrated in FIG. 11. The logical connections depicted in FIG. 11 include a local area network (LAN) 451 and a wide area network (WAN) 452. Such networking environments are commonplace in offices, enterprise-wide computer networks, intranets and the Internet.

When used in a LAN networking environment, the computer 420 is connected to the local network 451 through a network interface or adapter 453. When used in a WAN networking environment, the server computer 420 typically includes a modem 454, or is connected to a communications server on the LAN, or has other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the computer 420, unless indicated otherwise. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations where data bits are maintained are physical locations that have particular electrical, magnetic, or optical properties corresponding to the data bits.

The present invention has been illustrated with respect to a programming methodology and/or computer architecture and a particular example, however, it is to be appreciated that various programming methodology and/or computer architecture suitable for carrying out the present invention may be employed and are intended to fall within the scope of the hereto appended claims.

The invention has been described with reference to the preferred aspects of the invention. Obviously, modifications and alterations will occur to others upon reading and understanding the foregone detailed description. It is intended that the invention be construed as including all such modifications alterations, and equivalents thereof.

What is claimed is:

1. A system comprising a processor and memory configured to facilitate that facilitates accessing an interface virtual table for quick resolution of an implementation of an interface for a class type, comprising:
   an interface map having a plurality of slots for referencing at least one interface virtual table that corresponds to an implementation of an interface for a class type; and
   a pre-execution engine that determines at least one row structure relating to a set of ordered references to the interface virtual tables for the class type and stores the row structure in the interface map for subsequent access of the implementation of the interface for the class type, by utilizing a comb-vector technique that analyzes the interface map and determines where the row structure fits based at least in part on the configuration of the row structure by sliding the row structure down in memory until relevant entries rest on empty slot locations in the interface map.

2. The system of claim 1, the row structure includes at least one reference to the interface virtual tables.

3. The system of claim 1, the pre-execution engine is at least one of a loader, a linker, or a compiler.

4. The system of claim 1, further comprising an interface index component that assigns the interfaces an interface index number as the interfaces are loaded.

5. The system of claim 4, the pre-execution engine determines the row structure for the class type further based at least in part on the interface index numbers.

6. The system of claim 4, the pre-execution engine assigns a row start location to a class method table for the row structure, the row start location provides a starting location within the interface map for the row structure of the class type and the interface index numbers provide an offset from the row start location to access the implementation of the interface for the class type.

7. The system of claim 4, further comprising an execution engine that receives a method call of the implementation of the interface for the class type and accesses the interface virtual table via the interface map.

8. The system of claim 7, the execution engine locates the slot location within the interface map with the reference to the interface virtual table via the row start location and the interface index number that corresponds to the desired interface.

9. A computer implemented method of creating a reference map to access an interface virtual table for quick resolution of an implementation of an interface for a class type, comprising:
   allocating a vector in memory for creating at least one interface map having a plurality of slots for storing references to at least one interface virtual table that corresponds to an implementation of an interface for a class type;
   loading source code having a plurality of class types and a plurality of interfaces implemented by the class types;
   determining at least one row structure relating to a set of ordered references to the interface virtual tables for the class type based at least in part on the implementation of the interface for the class type; and
   storing the row structure in the interface maps for subsequent access of the implementation of the interface for the class type, by utilizing a comb-vector technique that analyzes the interface map and determines where the row structure fits based at least in part on a configuration of the row structure by sliding the row structure down in memory until relevant entries rest on empty slot locations in the interface map.

10. The method of claim 9, further comprising dynamically allocating at least one additional interface map in memory as the interface map is filled.

11. The method of claim 9, further comprising dynamically allocating at least one additional interface map in memory for storing a reference to a COM interface.

12. The method of claim 9, further comprising respectively assigning an interface index number to the interfaces as the interfaces are loaded.

13. The method of claim 12, farther comprising determining the row structure for the class type further based at least in part on the interface index numbers.

14. The method of claim 12, farther comprising casting a class instance to the interface utilizing the interface map.

15. The method of claim 12, farther comprising:
   receiving a method call of the implementation of the interface for the class type; and
   accessing the interface virtual table that corresponds to the implementation of the interface for the class type via the interface map.

16. The method of claim 12, further comprising:
   assigning a row start location to a class method table for the row structure; and
   accessing the implementation of the interface for the class type via the row staff location and the interface index numbers, the row start location provides a starting location within the interface map for the row structure of the class type and the interface index numbers provide an offset from the row start location.

17. The method of claim 16, farther comprising:
   locating the slot in the interface map that references the interface virtual table via the row start location and the interface index numbers that correspond to the desired interface.

18. A system comprising a processor and memory configured to facilitate accessing an interface virtual table for quick resolution of an implementation of an interface for a class type, comprising:
   means for allocating a vector in memory for creating at least one interface map having a plurality of slots for storing references to at least one interface virtual table that corresponds to an implementation of an interface for a class type;
   means for loading source code having a plurality of class types and a plurality of interfaces implemented by the class types;
   means for determining at least one row structure relating to a set of ordered references to the interface virtual tables for the class type based at least in part on the implementation of the interface for the class type; and
   means for storing the row structure in the interface map, for subsequent access of the implementation of the interface for the class type, by utilizing a comb-vector technique that analyzes the interface map and determines where the row structure fits based at least in part on a configuration of the row structure by sliding the row structure down in memory until relevant entries rest on empty slot locations in the interface map.

* * * * *